2 Sheets—Sheet 1.

M. RUNSTETLER.

Assignor to the FARMER'S FRIEND MANUFACTURING COMPANY.

CORN PLANTER.

No. 10,155. Reissued July 11, 1882.

Witness,
Jno. E. Giles.
Herbert P. Cook.

Inventor;
M. Runstetler
by Wood & Boyd
his Attorneys.

N. PETERS, Photo-Lithographer, Washington, D. C.

2 Sheets—Sheet 2.

M. RUNSTETLER.

Assignor to the FARMER'S FRIEND MANUFACTURING COMPANY.

CORN PLANTER.

No. 10,155. Reissued July 11, 1882.

Attest,
Jno. E. Wiles,
Herbert P. Cook.

Inventor,
M. Runstetler,
by Wood & Boyd
his Attorneys &c.

N. PETERS, Photo-Lithographer, Washington, D. C.

UNITED STATES PATENT OFFICE.

MICHAEL RUNSTETLER, OF DAYTON, OHIO, ASSIGNOR TO THE FARMERS FRIEND MANUFACTURING COMPANY, OF SAME PLACE.

CORN-PLANTER.

SPECIFICATION forming part of Reissued Letters Patent No. 10,155, dated July 11, 1882.

Original No. 231,104, dated August 10, 1880. Application for reissue filed May 15, 1882.

*To all whom it may concern:*

Be it known that I, MICHAEL RUNSTETLER, a citizen of the United States, residing at Dayton, in the county of Montgomery and State of Ohio, have invented certain new and useful Improvements in Corn-Planters, of which the following is a specification.

My invention relates to an improvement in corn-planters of the class employing a main frame mounted on wheels, which main frame is combined with a runner-frame in front, and so attached to the main frame that it may be either a rigid or yielding planter, and also employing cone-gears and driving-chains to actuate the dropping mechanism for planting, and adapted to be used either as a rigid or yielding planter.

My improvement consists, first, in the arrangement of a lifting hand-lever connected to a foot-lever which is pivoted to the main frame, the forward end of which lever is hinged to the runner-frame, the several parts being so arranged that the runner-frame may be controlled by either the hand-lever or foot-lever, or both, at the will of the operator.

My invention further consists in combining with the hand-lever detachable fastening devices, so as to be set in proper position to form a rigid planter, and so that the fastening devices can be dispensed with and the hand and foot levers used to control the operation of the machine when used as a yielding planter.

The invention further consists of other features, all of which will be fully hereinafter described in detail.

Figure 1:
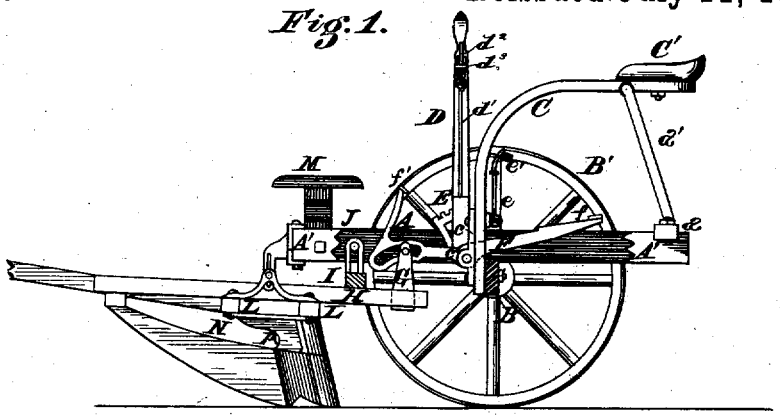
Figure 2:
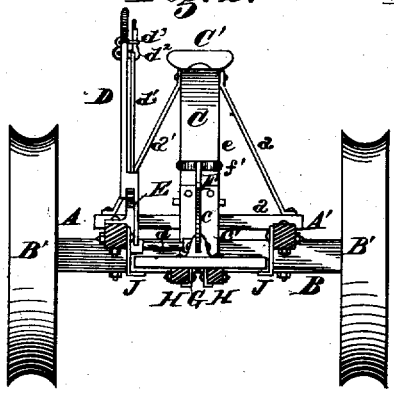
Figure 6:
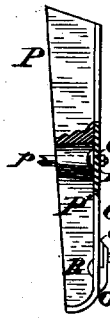
Figure 4:
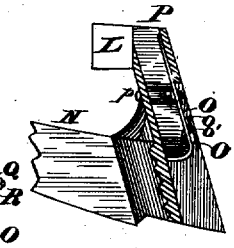
Figure 3:
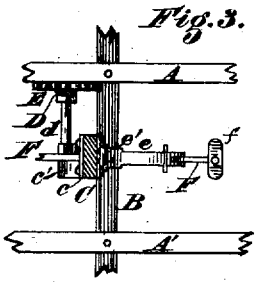
Figure 5:
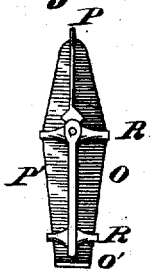
Figure 10:
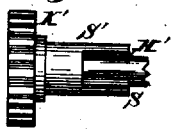
Figure 15:
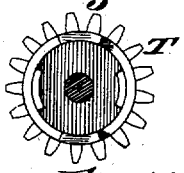
Figure 11:
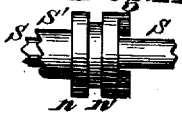
Figure 7:
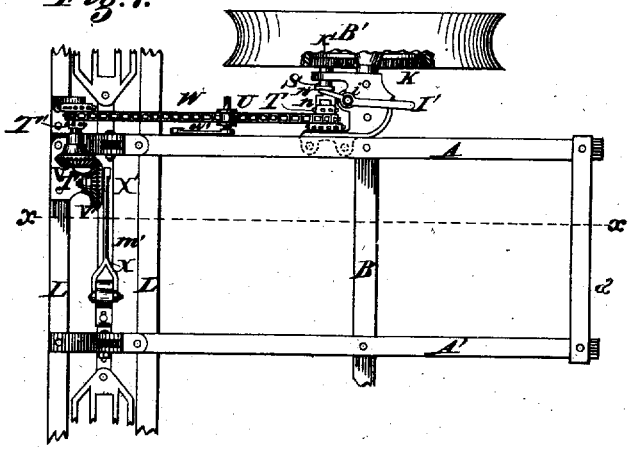
Figure 9:
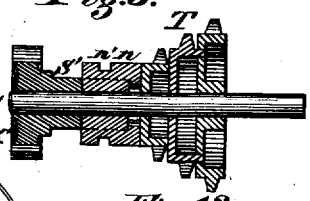
Figure 8:
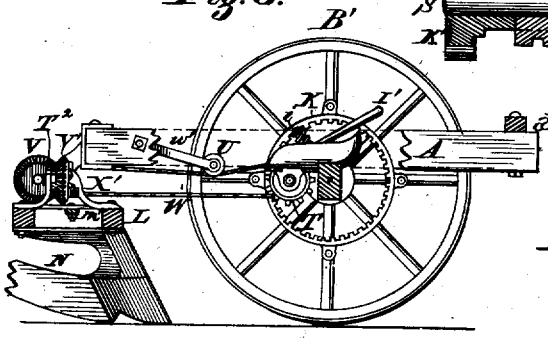
Figure 12:
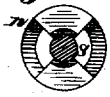
Figure 13:
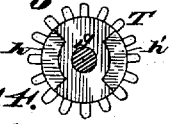
Figure 14:
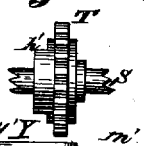
Figure 16:
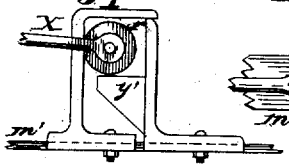
Figure 17:
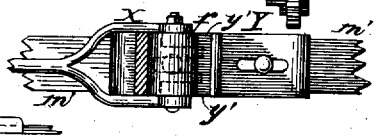
Figure 18:
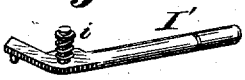

In the accompanying drawings, Figure 1 is a side elevation, partly in section, of a corn-planter embodying the first features of my invention. Fig. 2 is a front elevation, partly in section, of the same. Fig. 3 is a broken plan view, partly in section, showing the connection between the hand and foot levers. Fig. 4 is an elevation showing one of the runners with my improved dropping devices. Fig. 5 is a vertical front elevation of the dropper mechanism; Fig. 6, a side elevation of the same. Fig. 7 is a plan of the improved driving mechanism. Fig. 8 is a side elevation, partly in section, of the same, line *x x*, Fig. 7. Fig. 9 is a cross-section of the cone sprocket-wheels and clutch device. Fig. 10 is a horizontal elevation of part of the clutch device and drive-gear. Figs. 11 and 12 are elevations of the clutch, with immediate connections broken and in section. Figs. 13 and 14 are elevations of one of the clutch sprocket-wheels. Fig. 15 is an elevation showing the back of one of the sprocket-wheels. Fig. 16 is a vertical elevation of the pitman-connection bracket on the dropper-rod. Fig. 17 is a plan view, partly in section, of the same. Fig. 18 is a perspective view of the clutch-lever.

A A′ represent the main frame; B, the axle; B′, grooved wheels; C′, the seat-standard; F, the foot-lever; N H L G, the runner-frame. These several parts are fully described in prior patents.

*d* represents a shaft journaled at one end to the main frame and at the other to the seat-standard.

*c′* represents the journal-bracket at the seat-standard, the foot-lever F being rigidly connected to and journaled on shaft *d*.

D represents a hand-lever rigidly connected to the foot-lever by shaft *d* or other equivalent means.

E represents a segmental notch-plate rigidly fastened to the main frame A.

*d′* represents a lock for lever D, passing through the shoulder of lever D and engaging at one end with the segmental notch-plate E, and hinged at the other end to a bell-crank lever, $d^2$, the movement of which locks and unlocks the lifting-lever D.

When it is desired to operate the machine as a yielding planter the locking device *d′* is thrown out of connection with the segment-plate and secured by a hasp, $d^3$, the hand and foot levers then being free to vibrate with the runner-frame and under control of the operator. When the locking devices of the lifting-lever D are brought into operation the operator sets the runner-frame in any given position by means of lever D, the lock-lever holding it rigid, but under easy control of the hand; or the foot-lever may be used to assist in raising or lowering the frame, and the weight of the driver may be thrown upon the foot-lever to force the runners into the ground, if necessary.

P represents the dropper-valve placed in the grain-spout; *p*, a pivot-bolt on which the valve P oscillates.

P′ is a partition in the grain-spout, and held in a fixed position in the bottom portion thereof by means of the lugs R R, but readily detachable therefrom by removal of the bolt *p*, upon which it is suspended.

In the operation of valves of this kind great difficulty has been experienced in uniformly dropping the seed when used as a drill. If the valve is removed entirely, the seed drops out too far in the rear to be well covered, and if the partition alone is removed the operation of the valve interferes with the regular dropping of the seed.

To obviate these difficulties I have made the lower portion of the valve which covers the grain-channel removable, so as to deposit the seed between the heels of the runners, beneath the surface of the ground, the grain-channel being always open for the continuous dropping of the seed.

Fig. 6 shows the preferred form of joint for making the valve detachable.

K′ represents a pinion mounted or cast on sleeve S′, through which passes the shaft S, which is rigidly attached to said sleeve and pinion.

H′ represents two slots or openings cut on the inner end of sleeve S′.

*n* represents a sliding-clutch collar having a circular groove, *n*′, and mounted loosely on pinion-shafts S.

I′ represents a lever hinged to the bracket E′ by bolt *i*.

T represents a cone sprocket-wheel, a series of which may be used, and cast in separate pieces and united by clutches, as shown in Figs. 9, 13, and 15; or they may be cast in one piece. They are connected with the sliding clutch *n*, and slide laterally with it on shaft S. By moving the lever I′ the clutch *n* and cones T may be made to engage or disengage with the revolving sleeve S′ and clutch N′, thereby throwing the transmitter in and out of gear.

T′ represents sprocket-wheels fixed on a shaft and suitably journaled in bracket-bearings attached to the cross-pieces L L of the runner-frame.

V represents a bevel-pinion on the opposite end of said shaft, which engages with a corresponding bevel-wheel, V′, which is journaled and supported on a bracket, $T^2$, as shown in Fig. 7.

X′ represents a crank-pin on the face of bevel-wheel V′.

X represents a forked pinion journaling on said crank-pin, and supported on its opposite end preferably by a roller, *r*, working in a slotted bracket, Y, (shown in Figs. 16 and 17,) and performing the functions of an ordinary wrist, but in a more efficient manner. Bracket Y is preferably made in two parts, so as to be adjustable.

*y*′ represents a tram for roller *r*, which is allowed a small lateral motion independent of the motion of the driving-bar *m*′, which is reciprocated by the pitman. This play of the roller *r* is important, as it imparts a sudden motion to the seeding devices at each end of the stroke, causing an instantaneous dropping of the seed. The feet of bracket Y are slotted to allow of adjustment to regulate the play of the roller *r* and the stroke of the pitman.

W represents an ordinary drive or sprocket chain.

*w*′ represents a crank-shaft pivoted to the frame A and carrying a roller, U, resting upon the drive-chain W. It is made of sufficient weight to take up the slack of the drive-chain when the machine is used as a yielding planter. It is shown as flanged and sliding laterally with the drive-chain; but it may be smooth and made of a length corresponding with the width of the cone T.

I do not broadly claim the operation of the seed-slide in a seeding-machine by means of sprocket-wheels and a chain, as in Patent No. 196,291, and neither do I claim broadly the operation of the seeding devices by a gear-connection with one of the supporting-wheels, as in Patent No. 210,214, as such are not my present invention.

I claim—

1. In a corn-planter having the rear main frame mounted on supporting-wheels and the front runner-frame hinged or pivoted to the main frame, the combination of a foot-treadle and a hand-lever adapted to be used in conjunction or independently for the purpose of elevating or depressing the runners, substantially as herein set forth.

2. In a corn-planter having the rear main frame mounted on supporting-wheels and the front runner-frame hinged or pivoted to the main frame, a foot-treadle for elevating or depressing the runner-frame, in combination with a hand lock-lever, the foot-treadle and hand-lever adapted to be used in conjunction for forcing and locking the runners into the ground or lifting and locking them out of the ground, substantially as herein set forth.

3. In a corn-planter having the rear main frame mounted on supporting-wheels and the front runner-frame hinged or pivoted to the main frame, a foot-treadle for elevating or depressing the runner-frame, in combination with a hand-lever rigidly connected therewith, that either hand-lever or treadle may be used for forcing the runners into the ground or lifting them out of the ground, substantially as herein set forth.

4. The combination, in a corn-planter having the rear main frame mounted on supporting-wheels and a front runner-frame hinged or pivoted to the main frame, of a foot-treadle for elevating the runner-frame, and a hand-lever for elevating or depressing the same, both arranged to move simultaneously when either is acted upon by an operator.

5. In a corn-planter having the main runner-frame mounted on ground-wheels, a runner-frame hinged to the main frame, and having a transversely-arranged bar for reciprocating the seed-dropping device, the combination of a sprocket-wheel journaled on the main frame and connected by a clutch device with a driving-gear on the ground-wheel, a sprocket-chain, and a sprocket-wheel fixed to a shaft with the transverse bar for reciprocating the latter to actuate the seed-droppers, all essentially as herein shown and described.

6. In a corn-planting machine, the slotted or open bracket Y for connecting the pitman to the reciprocating bar, having the bearing or tramway Y′ for supporting a forked pitman, X, substantially as herein set forth.

7. In a corn-planting machine, the bracket Y, made in two parts, with the slotted feet for adjusting the bracket to the stroke of the pitman, substantially as herein set forth.

8. In a corn-planting machine, the forked pitman X and wrist *r*, in combination with the adjustable bracket Y, having the wrist-bearing Y′ and attached to the reciprocating bar, substantially as herein set forth.

9. The valve P, made in two parts, O O′, and united by detachable fastening devices, whereby the lower portion is readily removed without disturbing the other parts of the seed-dropping mechanism, substantially as herein set forth.

MICHAEL RUNSTETLER.

Witnesses:

V. P. VAN HORNE,

GEORGE O. WARRINGTON.